US010789776B2

(12) United States Patent
Schmalstieg et al.

(10) Patent No.: US 10,789,776 B2
(45) Date of Patent: Sep. 29, 2020

(54) STRUCTURAL MODELING USING DEPTH SENSORS

(71) Applicant: QUALCOMM Incorporated, San Diego, CA (US)

(72) Inventors: Dieter Schmalstieg, Graz (AT); Gerhard Reitmayr, San Diego, CA (US); Thanh Quoc Nguyen, Graz (AT); Raphael Grasset, Graz (AT); Tobias Langlotz, Graz (AT); Hartmut Seichter, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 15/902,248

(22) Filed: Feb. 22, 2018

(65) Prior Publication Data
US 2018/0182176 A1 Jun. 28, 2018

Related U.S. Application Data

(63) Continuation of application No. 14/250,544, filed on Apr. 11, 2014, now Pat. No. 9,934,611.
(Continued)

(51) Int. Cl.
*G06T 19/00* (2011.01)
*G06T 17/00* (2006.01)
(Continued)

(52) U.S. Cl.
CPC .......... *G06T 19/006* (2013.01); *G06T 7/12* (2017.01); *G06T 17/00* (2013.01); *H04N 13/00* (2013.01);
(Continued)

(58) Field of Classification Search
None
See application file for complete search history.

(56) References Cited

U.S. PATENT DOCUMENTS 5,712,964 A * 1/1998 Kamada .................. G06T 13/00
345/418
5,988,862 A * 11/1999 Kacyra ................ G01B 11/002
382/195
(Continued)

FOREIGN PATENT DOCUMENTS

CN 102129709 A 7/2011
CN 102982560 A 3/2013
(Continued)

OTHER PUBLICATIONS

Du H., et al., "Interactive 3D Modeling of Indoor Environments with a Consumer Depth Camera," Proceedings of the 13th International Conference on Ubiquitous Computing, Sep. 17, 2011 (Sep. 17, 2011), pp. 75-84, XP055163337, DOI: 10.1145/2030112.2030123 ISBN: 978-1-45-030630-0 abstract p. 76, left-hand column, line 15-line 37 p. 76, right-hand column, line 4-p. 77, right-hand column, line 11 p. 78, right-hand column, line 3-p. 79, right-hand column, line 31.
(Continued)

Primary Examiner — Jason A Pringle-Parker
(74) Attorney, Agent, or Firm — QUALCOMM Incorporated

(57) ABSTRACT

Techniques are presented for constructing a digital representation of a physical environment. In some embodiments, a method includes obtaining image data indicative of the physical environment; receiving gesture input data from a user corresponding to at least one location in the physical environment, based on the obtained image data; detecting at least one discontinuity in the physical environment near the at least one location corresponding to the received gesture
(Continued)

input data; and generating a digital surface corresponding to a surface in the physical environment, based on the received gesture input data and the at least one discontinuity.

27 Claims, 13 Drawing Sheets

Related U.S. Application Data

(60) Provisional application No. 61/876,421, filed on Sep. 11, 2013.

(51) Int. Cl.
*G06T 7/12* (2017.01)
*H04N 13/00* (2018.01)

(52) U.S. Cl.
CPC ........... *G06T 2207/10028* (2013.01); *G06T 2207/20096* (2013.01); *G06T 2207/20101* (2013.01)

(56) References Cited

U.S. PATENT DOCUMENTS

| | | | |
|---|---|---|---|
| 6,721,769 B1* | 4/2004 | Rappaport | G06F 16/50 707/737 |
| 7,164,490 B2 | 1/2007 | Manico et al. | |
| 7,425,958 B2 | 9/2008 | Berger et al. | |
| 7,747,067 B2 | 6/2010 | Popescu et al. | |
| 8,040,361 B2 | 10/2011 | Bachelder et al. | |
| 8,369,610 B1 | 2/2013 | Korobkin | |
| 8,542,911 B1 | 9/2013 | Korobkin | |
| 9,047,507 B2 | 6/2015 | Gurman et al. | |
| 9,153,031 B2 | 10/2015 | El-Saban et al. | |
| 9,349,163 B2 | 5/2016 | Choi et al. | |
| 2003/0095710 A1 | 5/2003 | Tessadro | |
| 2003/0132935 A1 | 7/2003 | Ellenby et al. | |
| 2004/0223053 A1 | 11/2004 | Gladnick et al. | |
| 2005/0031166 A1 | 2/2005 | Fujimura et al. | |
| 2005/0081161 A1* | 4/2005 | MacInnes | G06F 17/5004 715/765 |
| 2005/0091007 A1* | 4/2005 | Lindenbaum | G06T 17/10 703/1 |
| 2005/0114373 A1 | 5/2005 | Kulp et al. | |
| 2005/0128196 A1* | 6/2005 | Popescu | G01B 11/25 345/420 |
| 2005/0207652 A1 | 9/2005 | Albertelli et al. | |
| 2005/0271273 A1 | 12/2005 | Blake et al. | |
| 2006/0023937 A1 | 2/2006 | Tessadro | |
| 2007/0139418 A1* | 6/2007 | Abel | G06T 13/20 345/474 |
| 2008/0204763 A1 | 8/2008 | Turbell et al. | |
| 2009/0228842 A1 | 9/2009 | Westerman et al. | |
| 2009/0290758 A1 | 11/2009 | Ng-Thow-Hing et al. | |
| 2009/0323121 A1 | 12/2009 | Valkenburg et al. | |
| 2010/0214284 A1* | 8/2010 | Rieffel | G06T 17/00 345/419 |
| 2010/0284572 A1 | 11/2010 | Lukas et al. | |
| 2011/0109617 A1 | 5/2011 | Snook et al. | |
| 2012/0120277 A1 | 5/2012 | Tsai | |
| 2012/0229508 A1 | 9/2012 | Wigdor et al. | |
| 2013/0050432 A1 | 2/2013 | Perez et al. | |
| 2013/0107010 A1 | 5/2013 | Hoiem et al. | |
| 2013/0124148 A1* | 5/2013 | Jin | G06F 17/5086 703/1 |
| 2013/0181983 A1 | 7/2013 | Kitamura et al. | |
| 2013/0282345 A1 | 10/2013 | McCulloch et al. | |
| 2013/0314562 A1 | 11/2013 | Shibuya et al. | |
| 2013/0335303 A1 | 12/2013 | MacIocci et al. | |
| 2014/0059169 A1 | 2/2014 | Ko et al. | |
| 2014/0064602 A1 | 3/2014 | Li et al. | |
| 2014/0079334 A1 | 3/2014 | Verrall et al. | |
| 2014/0153816 A1 | 6/2014 | Cohen et al. | |
| 2014/0192238 A1 | 7/2014 | Attar et al. | |
| 2014/0363073 A1 | 12/2014 | Shirakyan et al. | |
| 2015/0070387 A1 | 3/2015 | Schmalstieg et al. | |

FOREIGN PATENT DOCUMENTS

| | | |
|---|---|---|
| JP | 2006503379 A | 1/2006 |
| JP | 2012008867 A | 1/2012 |
| WO | 2004042662 A1 | 5/2004 |

OTHER PUBLICATIONS

International Search Report and Written Opinion—PCT/US2014/055178—ISA/EPO—Jan. 29, 2015.

Kowdle A, et al., "Active learning for piecewise planar 3D reconstruction", Computer Vision and Pattern Recognition (CVPR), 2011 IEEE Conference on, IEEE, Jun. 20, 2011 (Jun. 20, 2011), pp. 929-936, XP032038140, DOI: 10.1109/CVPR.2011.5995638 ISBN: 978-1-4577-0394-2 abstract p. 929, right-hand column, line 1-line 15 p. 930, right-hand column, last paragraph-p. 931, left-hand column, paragraph 1 p. 933, left-land column, line 6-right-hand column, line 4 figures 1,3,7.

Kowdle A, et al., "Scribble based interactive 3D reconstruction via scene co-segmentation", Image Processing (ICIP), 2011 18th IEEE International Conference on, IEEE, Sep. 11, 2011 (Sep. 11, 2011), pp. 2577-2580, XP032080196, DOI: 10.1109/ICIP.2011.6116190 ISBN: 978-1-4577-1304-0 abstract p. 2577, left-hand column, line 1-p. 2578, right-hand column, line 37.

Sinha S N, et al., "Interactive 3D architectural modeling from unordered photo collections", ACM Transactions on Graphics, vol. 27, No. 5, Dec. 1, 2008 (Dec. 1, 2008), p. 1, XP055008808, ISSN: 0730-0301, DOI: 10.1145/1409060.1409112 abstract p. 1, right-hand column, line 5-line 33 p. 2, right-hand column, last paragraph-p. 3, left-hand column, line 34 p. 3, right-hand column, line 1-p. 5, left-hand column, last line figures 1-3, 7,8.

European Search Report—EP19153265—Search Authority—Munich—May 6, 2019.

Langlotz.,et al., "Sketching Up the World: In-situ Authoring for Mobile Augmented Reality" International Workshop on Smartphone Applications and Services 2010, Dec. 9, 2010 (Dec. 9, 2010), 8 Pages, XP055029083, DOI: 10.1007/ s00779-011-0430-0, Retrieved from the Internet: URL: http://mooslechner.info/workperformed/mt/smartphone2010.pdf [retrieved on Jun. 6, 2012], abstract. p. 624, left-hand column, line 6-line 37, p. 626, left-hand column, line 1, p. 628, left-hand column, line 4, p. 629, left-hand column, line 9-line 33.

\* cited by examiner

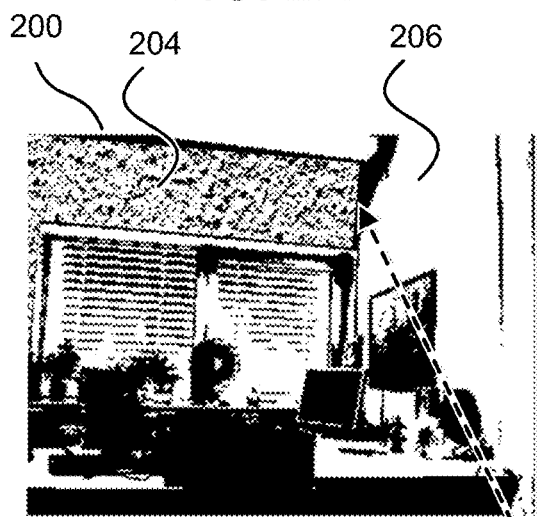
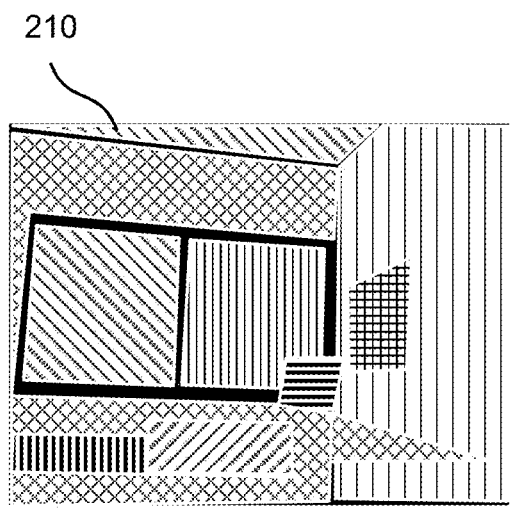
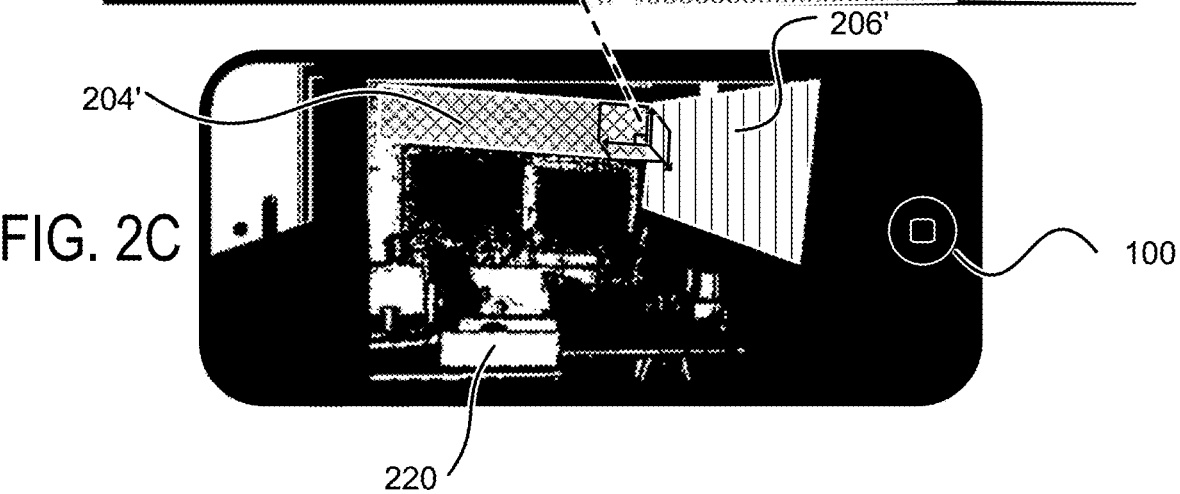

STRUCTURAL MODELING USING DEPTH SENSORS

CROSS-REFERENCE TO RELATED APPLICATIONS

This application is a Continuation of U.S. application Ser. No. 14/250,544, filed Apr. 11, 2014, which claims the benefit of U.S. Provisional Application No. 61/876,421, filed Sep. 11, 2013, both of which are hereby incorporated by reference, in their entirety and for all purposes.

BACKGROUND

The present disclosures generally relate to augmented reality environments, and more specifically, modeling physical environments in real time.

In augmented reality (AR) environments, a user may wish to obtain a model of his physical surroundings to enable AR functions. For example, the user may wish to model key structures of a view of his office, which may include the surfaces of the walls, floor and ceiling, and the table surfaces of a desk. Current methods of modeling a real-life physical environment may lack the ability to distinguish different surfaces from each other, and instead simply generate a dense reconstruction of points indicating depth associated for each point from a camera view. Furthermore, this set of points may not contain any way to distinguish which points belong to a wall, or which points belong to a desk, and so forth. Lacking such semantic meaning makes interacting with said AR walls or desk surfaces difficult. Furthermore, generating this set of points may be quite processor-intensive and less suitable for real-time use.

Embodiments of the invention solve this and other problems.

SUMMARY

The present disclosures generally relate to augmented reality environments, and more specifically, modeling physical environments in real time.

Methods and apparatuses are presented for modeling an augmented reality (AR) environment in real-time on a mobile device, based on intuitive user input and the user's physical environment. In some embodiments, a user can generate geometric shapes representing surfaces of the user's physical environment based on systems and methods of the present disclosures. In some embodiments, only approximate designations of such surfaces by the user are needed, and rapid inaccurate input may be acceptable in some cases. In some embodiments, sensor functionality to the mobile device, e.g., input from a depth camera, can be used to infer a remaining portion of surfaces that a user does not fully specify. In some embodiments, methods and applications include a manual user interface, while in other embodiments, a more "semi-automatic" user interface may be employed.

Using known methods in the industry, depth sensors may produce three dimensional (3D) reconstructions that include extremely detailed information, resulting in a model that may contain many geometric primitives without any semantics. However, for many applications, all that may be needed are geometric models made up of a low number of polygons, which represent the important structures of the environment, rather than an abundance of details. The modeled structure may include a polygonal model composed of geometric faces, edges and vertices, and simple volumes. Such geometric models may be referred to as structural models. For example, a simple room may include four walls, a floor, a ceiling, a door and a window, in total eight polygons. Note that these geometric structures have low complexity and often have constraints such as right angles or parallel edges.

Moreover, it may be important to attach semantic meaning to the structures. For example, a door can be used to access an adjacent room, or virtual objects can be constrained to stay on real surfaces, or a window can slide up and down. For interaction in Augmented Reality (AR), simplified structural models with relevant information may enable real-time processing of the information associated with the structural models on mobile devices. Therefore, embodiments of the invention propose representing important elements from the real world with a few polygons, such as a single rectangle for a door.

An example method for constructing a digital representation of a physical environment may include obtaining image data indicative of the physical environment; receiving user input data corresponding to at least one location in the physical environment, based on the obtained image data; detecting at least one discontinuity in the physical environment near the at least one location corresponding to the received user input data; and generating a digital surface corresponding to a surface in the physical environment, based on the received user input data and the at least one discontinuity. In some embodiments of the method, the received user input data specifies at least one edge of the digital surface. In other embodiments, the received user input data specifies at least one plane of the digital surface. In yet other embodiments, the received user input data comprises a plurality of points within the physical environment, based on the obtained image data, that are included as part of the digital surface.

In certain embodiments, the image data may include geometric depth information about the physical environment. In some implementations, the example method may detect at least one discontinuity that may include detecting in the physical environment where at least two planar surfaces intersect. In some implementation, the received user input data may include input data in 2-dimensional coordinates, and the generated digital surface may include output data in 3-dimensional coordinates. The example method may further include receiving a semantic input defining at least one function associated with the digital surface.

An example mobile device for constructing a digital representation of a physical environment may include a camera coupled to the mobile device for obtaining image data indicative of the physical environment. Furthermore, the mobile device may include a processor coupled to memory for receiving user input data corresponding to at least one location in the physical environment, based on the obtained image data; detecting at least one discontinuity in the physical environment near the at least one location corresponding to the received user input data; and generating a digital surface corresponding to a surface in the physical environment, based on the received user input data and the at least one discontinuity. In some embodiments of the mobile device, the received user input data specifies at least one edge of the digital surface. In other embodiments, the received user input data specifies at least one plane of the digital surface. In yet other embodiments, the received user input data comprises a plurality of points within the physical environment, based on the obtained image data, that are included as part of the digital surface.

In certain embodiments, the image data may include geometric depth information about the physical environment. In some implementations, components of the example mobile device may detect at least one discontinuity that may include detecting in the physical environment where at least two planar surfaces intersect. In some implementations, the received user input data may include input data in 2-dimensional coordinates, and the generated digital surface may include output data in 3-dimensional coordinates. The example mobile device may further include components for receiving a semantic input defining at least one function associated with the digital surface.

An example mobile device for constructing a digital representation of a physical environment may include a camera coupled to the mobile device for obtaining image data indicative of the physical environment. Furthermore, the mobile device may include a processor coupled to memory for receiving user input data corresponding to at least one location in the physical environment, based on the obtained image data; detecting at least one discontinuity in the physical environment near the at least one location corresponding to the received user input data; and generating a digital surface corresponding to a surface in the physical environment, based on the received user input data and the at least one discontinuity. In some embodiments of the mobile device, the received user input data specifies at least one edge of the digital surface. In other embodiments, the received user input data specifies at least one plane of the digital surface. In yet other embodiments, the received user input data comprises a plurality of points within the physical environment, based on the obtained image data, that are included as part of the digital surface.

In certain embodiments, the image data may include geometric depth information about the physical environment. In some implementations, components of the example mobile device may detect at least one discontinuity that may include detecting in the physical environment where at least two planar surfaces intersect. In some implementation, the received user input data may include input data in 2-dimensional coordinates, and the generated digital surface may include output data in 3-dimensional coordinates. The example mobile device may further include components for receiving a semantic input defining at least one function associated with the digital surface.

An example non-transitory computer-readable storage medium, wherein the non-transitory computer-readable storage medium comprises instructions executable by a processor, the instructions comprising instructions for constructing a digital representation of a physical environment, may include the capability of obtaining image data indicative of the physical environment; receiving user input data corresponding to at least one location in the physical environment, based on the obtained image data; detecting at least one discontinuity in the physical environment near the at least one location corresponding to the received user input data; and generating a digital surface corresponding to a surface in the physical environment, based on the received user input data and the at least one discontinuity. In some embodiments of the non-transitory computer-readable storage medium, the received user input data specifies at least one edge of the digital surface. In other embodiments, the received user input data specifies at least one plane of the digital surface. In yet other embodiments, the received user input data comprises a plurality of points within the physical environment, based on the obtained image data, that are included as part of the digital surface.

In certain embodiments, the image data may include geometric depth information about the physical environment. In some implementations, the instructions stored on the non-transitory computer-readable storage medium may detect at least one discontinuity that may include detecting in the physical environment where at least two planar surfaces intersect. In some implementations, the received user input data may include input data in 2-dimensional coordinates, and the generated digital surface may include output data in 3-dimensional coordinates. The example non-transitory computer-readable storage medium may further include instructions for receiving a semantic input defining at least one function associated with the digital surface.

An example apparatus for constructing a digital representation of a physical environment may include means for obtaining image data indicative of the physical environment; means for receiving user input data corresponding to at least one location in the physical environment, based on the obtained image data; means for detecting at least one discontinuity in the physical environment near the at least one location corresponding to the received user input data; and means for generating a digital surface corresponding to a surface in the physical environment, based on the received user input data and the at least one discontinuity. In some embodiments of the apparatus, the received user input data specifies at least one edge of the digital surface. In other embodiments, the received user input data specifies at least one plane of the digital surface. In yet other embodiments, the received user input data comprises a plurality of points within the physical environment, based on the obtained image data, that are included as part of the digital surface.

In certain embodiments, the image data may include geometric depth information about the physical environment. In some implementations, the example apparatus may include means for detecting at least one discontinuity that may include means for detecting in the physical environment where at least two planar surfaces intersect. In some implementations, the received user input data may include input data in 2-dimensional coordinates, and the generated digital surface may include output data in 3-dimensional coordinates. The example apparatus may further include means for receiving a semantic input defining at least one function associated with the digital surface.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

FIGS. 2A. 2B, and 2C show an example use case according to some embodiments.

DETAILED DESCRIPTION

Figure 1:
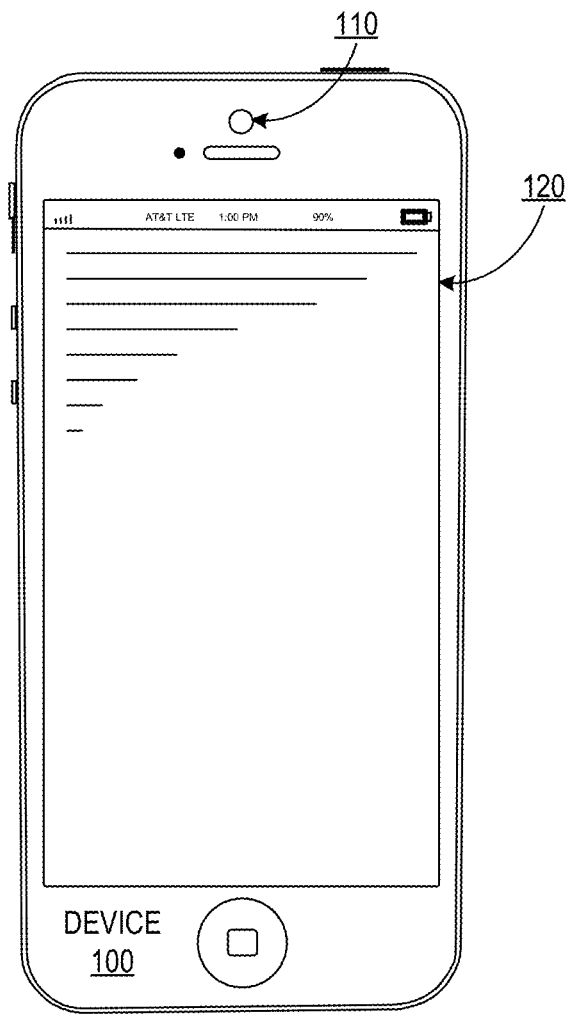
FIG. 1 is an example device that may implement various embodiments of the present disclosures.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Methods and apparatuses are presented for modeling an augmented reality (AR) environment in real-time on a mobile device based on intuitive user input and the user's physical environment. In some embodiments, a user can generate geometric shapes representing surfaces of the user's physical environment based on systems and methods of the present disclosures. In some embodiments, only approximate designations of such surfaces by the user are needed, and rapid inaccurate input may be acceptable in some cases. In some embodiments, sensor functionality to the mobile device, e.g., input from a depth camera, can be used to infer a remaining portion of surfaces that a user does not fully specify. In some embodiments, methods and applications include a manual user interface, while, in other embodiments, a more "semi-automatic" user interface may be employed.

Using known methods in the industry, depth sensors may produce 3D reconstructions that include extremely detailed information, resulting in a model that may contain many geometric primitives without any semantics. Inexpensive depth sensors can provide real-time dense reconstruction for indoor environments. The resulting 3D models may be used for Augmented Reality (AR); however the geometric models have millimeter-scale detail and consume significant processing and storage resources.

For many applications, all that may be needed are geometric models made up of a low number of polygons, which represent the important structures of the environment, rather than an abundance of details. The modeled structure may include a polygonal model composed of geometric faces, edges and vertices, and also simple volumes. Such geometric models may be referred to as structural models. For example, a simple room may include four walls, a floor, a ceiling, a door and a window, in total eight polygons. Note that these geometric structures have low complexity and often have constraints such as right angles or parallel edges. Moreover, it may be important to attach semantic meaning to the structures. For example, a door can be used to access an adjacent room, or virtual objects can be constrained to stay on real surfaces, or a window can slide up and down. For interaction in Augmented Reality (AR), simplified structural models with relevant information may enable real-time processing of the information associated with the structural models on mobile devices. Therefore, embodiments of the invention propose representing important elements from the real world with a few polygons, such as a single rectangle for a door.

Methods and apparatuses of the present disclosures illustrate use of a depth sensor for an AR modeling user interface where the interface enables the user to trace geometric shapes with a "virtual laser-pointer" metaphor to input a structural model, according to some embodiments. In some implementations, rapid inaccurate input may be acceptable, since the system may infer from the 3D reconstruction the intended geometry by the user. Furthermore, the mobile device may be configured to provide real-time visual feedback to the user.

The present disclosure illustrates a spatial AR modeling technique combining an estimate of a dense mesh obtained by sweeping a depth camera apparatus in an environment and refining the mesh into a structural model with a mobile user interface. In some embodiments, a mesh may refer to a plurality of data points for a 3D dimensional space. The mobile user interface may be configured to detect 3D gestures or user input for determining vertices, edges and planes in the AR view. The mobile user interface may be further configured to associate semantics with the structures in the AR view. For example, a drop down menu may allow the user to associate a door with the "door" semantics out of a number of other semantics such as windows, frames, etc. These examples and others will be described in more detail, below.

Referring to FIG. 1, example computing device 100 may be configured to implement one or more aspects of the disclosure. For example, computing device 100 may be a smart phone, tablet computer, personal digital assistant, or other mobile device that is equipped with one or more sensors that allow computing device 100 to receive image data or other data as a form of input. In another example, the computing device 100 may be a head-mounted device or any other computing device. In some embodiments, computing device 100 is not a mobile device, and may be, for example, a desktop computer, a gaming machine, a stationary sensor or camera, or a system of machines coupled together wirelessly or wired. Computing device 100 may be equipped with, be communicatively coupled to, and/or otherwise include one or more front-facing 110 or back facing cameras, mono-lens cameras, depth cameras, laser sensors, sonar sensors, and/or other sensors. The mobile device may also include one or more user interfaces for interacting with the device. For example, the mobile device may include a touchscreen 120 that the user may interact with to input data. Such interfaces may enable the user to define and outline geometric structures. Another interface may include a gesture recognition system for detecting gestures and interpreting the gestures as commands to the mobile device. In addition to including one or more sensors, computing device 100 may also include one or more processors, memory units, and/or other hardware components, as described in greater detail below.

In one or more arrangements, computing device 100 may use any and/or all of these sensors alone or in combination to obtain data about the natural surroundings of computing device 100, either based on images or other means for defining physical boundaries. For example, computing device 100 may use one or more cameras to obtain one or more graphical views of the natural surroundings of computing device 100. As a more complex example, one or more processors in combination with one or more cameras in computing device 100 may be used to view the natural surroundings through multiple images recorded and/or received over time. In a specific example, the natural surroundings may include a table or other flat surface, and multiple objects lying on top of the table. Computing device 100 may utilize one or more cameras to view the table from multiple angles or perspectives, providing multiple frames of image data about the table and the objects on it. While these image data are described here as examples, any other sort of data obtained by a computing device 100, whether through one or more sensors in computing device 100, or through wireless means or wired means, may be considered as part of implementing one or more aspects of the disclosure.

FIG. 2A illustrates an example office space. FIG. 2B illustrates a representation of the office space displayed by the mobile device enabled with a depth sensor. FIG. 2C illustrates a reconstructed model of the office space. According to embodiments of the invention, the mobile device 100 may generate a structural model.

Referring to FIG. 2A, a user using the mobile device 100 may model room 200. In this example, the user may aim the mobile device 100, as shown in FIG. 2B, at a region of interest (the edge between two walls 204 and 206 in FIG. 2A). Embodiments of the invention may instantly provide visual feedback by estimating the orthogonal edge (the Ortho-Space cursor displayed on the device 100) and highlight the support region of the current estimated planes (highlighted rectangles 204' and 206'). FIG. 2C illustrates the reconstructed planes. In some embodiments, as shown in FIG. 2B, the mobile device overlays the reconstructed structural model on top of the view of the office space to enable the user to associate the structures (e.g., rectangles) from FIG. 2C with the real-world objects from FIG. 2A.

Consistent with the example use case shown in FIGS. 2A, 2B and 2C, embodiments of the invention provide a user interface for the user to interactively enable generation of the structural model, while being assisted by a depth sensor framework. A set of example gestures is described that enables the user to incrementally build a proper structural model with low cognitive effort. As shown in FIG. 2B, in some embodiments, feedback may be provided instantaneously through registered graphics shown in an AR interface on the display of the mobile device 100.

Embodiments of the invention combine less precise and demanding user interactions and automatic reconstruction of 3D information from the depth sensor to generate the structural model. Combining user interaction with automatic reconstruction enables fast and precise construction of the structural model without requiring tedious interactions by the user and providing instant feedback to the user in most cases. Furthermore, according to some embodiments, user input, such as gestures, may be used within the proposed system to model objects in the environments as well as to assign semantics to the modeled objects.

In some embodiments, by specifying edges alone, the user can precisely, efficiently and intuitively control the geometry of the structural model that is generated with very little effort. For instance, the user can simply "draw" the outline of a polygon edge by edge. According to embodiments of the invention, additional geometry may be inferred automatically. Embodiments of the invention, such as the interface provided, allow for better control and provide computationally lightweight techniques for generating the structural model at the mobile device 100.

Furthermore, embodiments of the invention allow the user to create a structural model instantaneously and associate semantics with the various structures in real time on the mobile device. For example, the mobile device may generate a structural model for a window as a rectangle and provide the user the interface to associate the rectangle with semantics of a window. For instance, the semantics of a window may include that the window is made out of glass and is therefore transparent or that it can slide in one direction. Since the mobile device can generate the structural model and annotate the structural model with semantics in real-time, the user can use the structural model with its semantics in an augmented reality environment instantaneously.

An example application of such an augmented reality environment may include a user trying to remodel sections of the house. Once the different structures in a room are identified and annotated with semantics, the interface may further provide the user the ability to manipulate those structures. For example, in the above example, once the window is identified and annotated with semantics, the user may instruct the mobile device to widen the window and overlay the widened window in the augmented reality representation on the display of the mobile device.

In some implementations, the mobile device may provide the user with a manual user interface, whereas in other implementations the mobile device may provide the user with a semi-automatic user interface. The manual interface enables the user to explicitly and fully control the modeling process through specifying edges, while the semi-automatic interface allows the user to instantly select options from automatically estimated underlying local structures.

Figure 3:
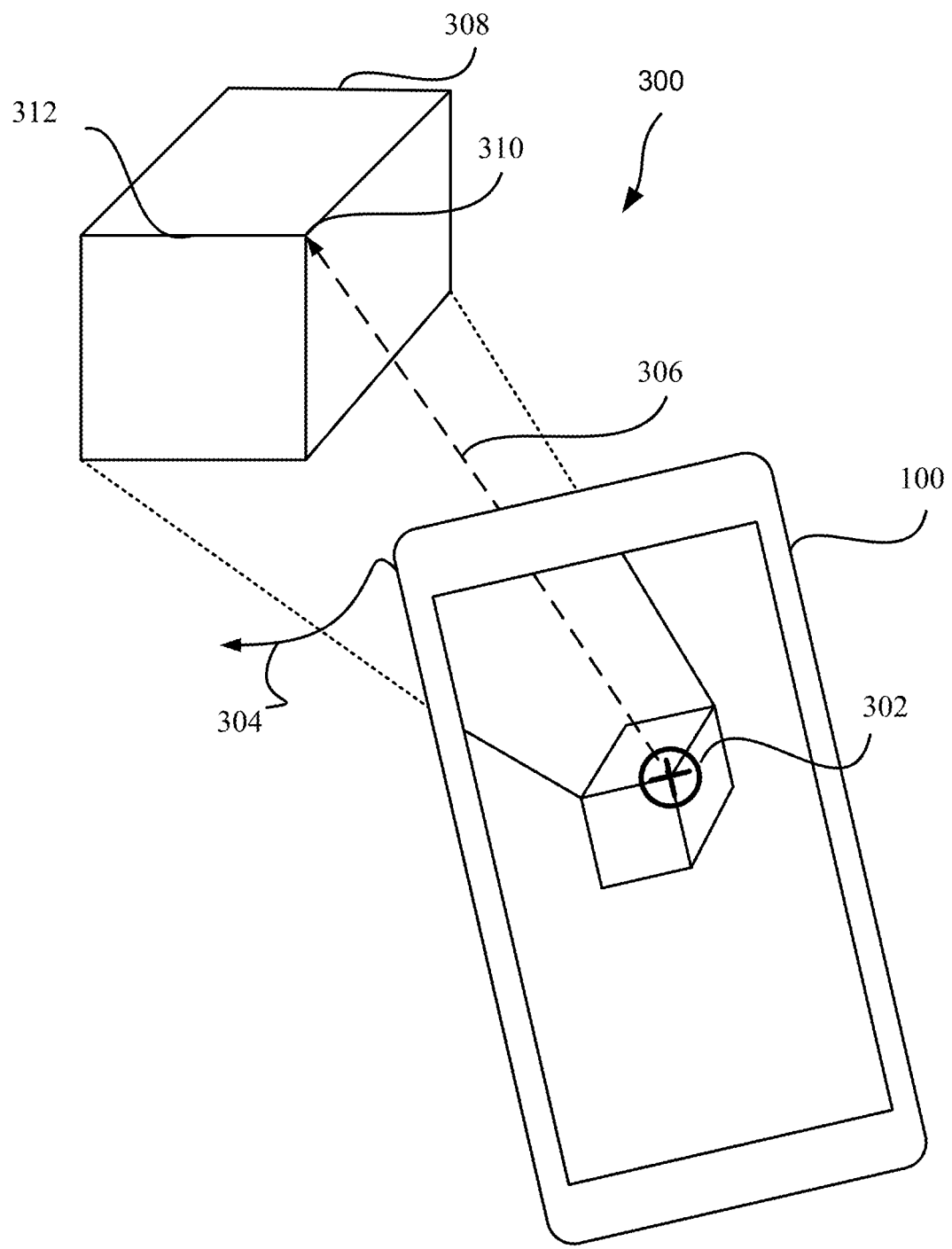
FIG. 3 illustrates a crosshair cursor on the mobile device and a projection corresponding to the current view of the mobile device camera.

Referring to FIG. 3, illustration 300 shows a crosshair cursor 302 displayed on the mobile device 100 and a projection of the 3D corresponding point in the current view of the mobile device camera. FIG. 3 illustrates a manual user interface to create faces through explicitly specifying bounding edges. In one example, when the user sweeps the mobile device 100 over the scene, the mobile device 100 is tracked relative to the scene, while the user is performing gestural input. By showing a crosshair cursor 302 on the screen, the user can slowly sweep the mobile device 100 over the scene and consequently move the crosshair cursor 302 over the edge of the box. In one implementation, the cursor location at every time may be shown by casting a ray 306 from the camera center through the crosshair and intersecting this ray with the environment.

In one example implementation, by moving the cursor and selecting an appropriate gesture type, the user may create the structural model. The gesture type selection may be done instantaneously by pressing a soft button on the touchscreen with the thumb while gesturing, therefore activating the gesture only as long as the button is pressed. However, any other technique for selection (menu, etc.) may also be employed without departing form the scope of the invention.

Figure 4A:
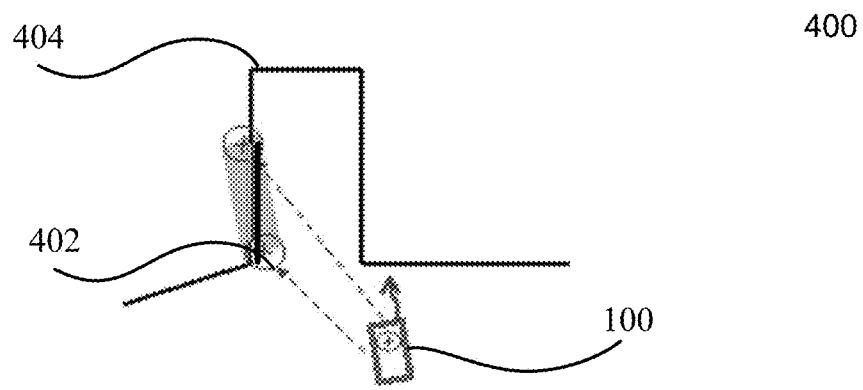
FIGS. 4A, 4B and 4C illustrate an example process of selecting an edge by the user.
Figure 4B:
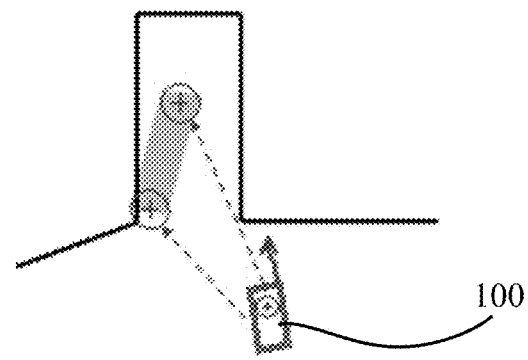
Figure 4C:
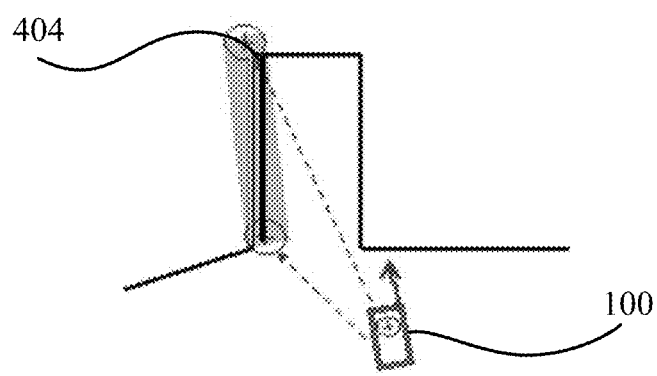

Referring back to FIG. 3, the user may approximately point the cursor to the start corner (310) and then slowly move the mobile device 100 and the crosshair cursor (in the direction indicated by arrow 304) to the end corner in order to select an "edge" (see FIG. 4A-4C). Along the user gesture, the system estimates an edge (as indicated by 312) in a coverage area determined by the start cursor location and current cursor location. These cursor locations define the coverage area where there is potentially evidence for an edge. Based on the coverage area, the system then solves for an optimal representation of the edge. In some embodiments, the edge must be a straight line in space, which is close to the ray indicated by the user, but the edge should also be close to a depth or normal discontinuity in the reconstruction. This example interaction technique requires the user to approximately point to corners, but allows the user to freely move the cursor in space in between the corners.

Referring to FIGS. 4A, 4B and 4C, a user specifies an edge through approximately pointing to start corner (402) and then to desirable end-point or end corner (404) of the edge. At the current cursor location, the system estimates and provides feedback about the edge to the user (indicated by the double edge in FIGS. 4A and 4C). FIGS. 4A and 4C illustrate that the user may approximate the edge. Even though the user may approximately move the cursor over the edge, the edge detection system running on the mobile device can detect the edge, since the edge represents a strong geometric feature indicated by the intersection of two planes. For example, in FIG. 4B, even though the cursor moves away from the edge and the edge may not be momentarily shown as detected in the display (as shown in FIG. 4B), the edge can still be detected as long as the cursor approximately returns back to the edge and consequently moves towards the desirable end point (as indicated in FIG. 4C).

One after the other as the edges for a geometric structure may be identified by the mobile device, the face of the structure may also identified when the endpoint of an edge is close enough to the starting point of the first edge. In such scenarios, the edge loop may be automatically closed and a face identified. In one embodiment, the user can also press a "make face" button to immediately create a face by inserting an additional edge from the current endpoint of the edge sequence back to the starting point.

In one embodiment, if few of the edges of a rectangle have been specified, the user can also press a "make rectangle" button to indicate that a rectangle should be created using the specified edges. In this scenario, the system optimizes the sequence so that a rectangle may be created. If only two or three edges are currently in the sequence, the mobile device may determine the missing edges.

Figure 5:
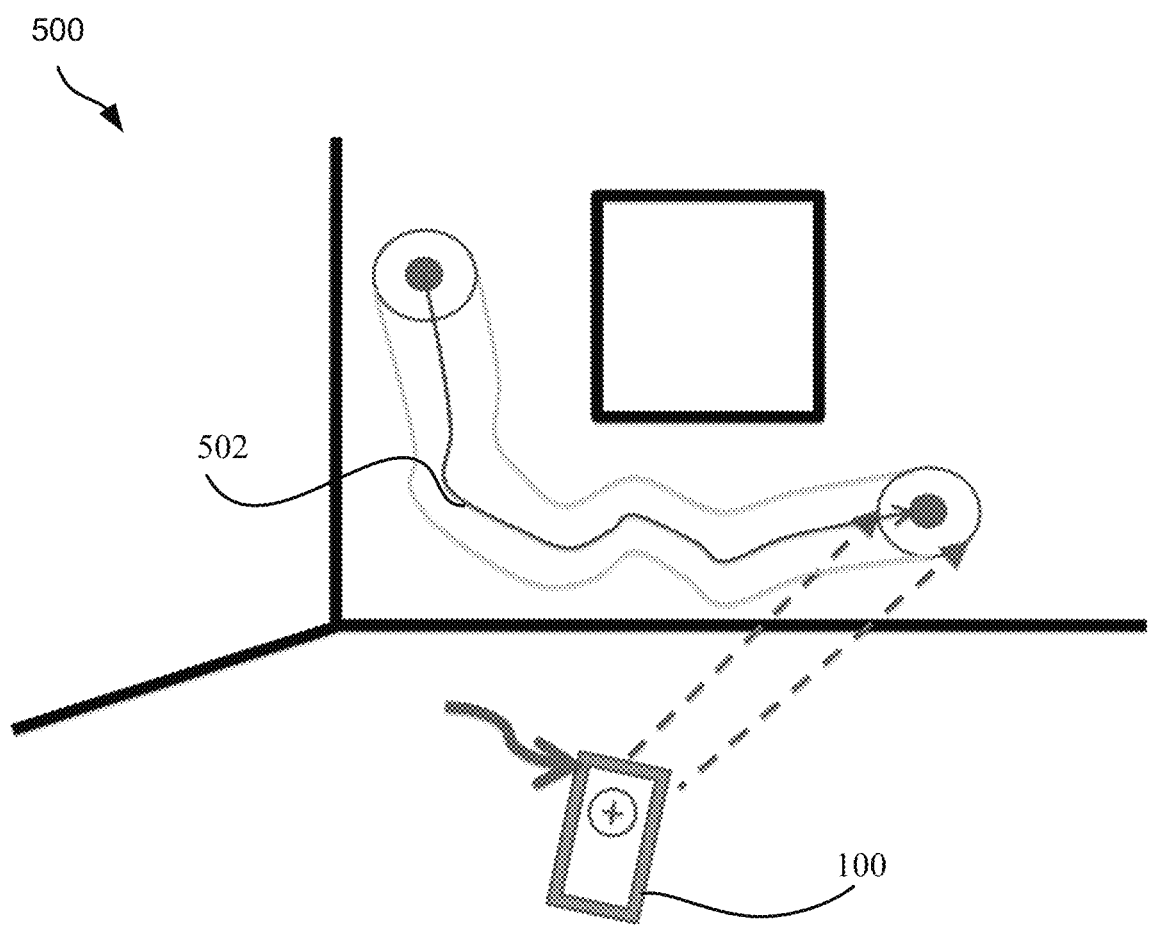
FIG. 5 illustrates an example process of specifying a plane by the user.

Referring to FIG. 5, illustration 500 shows how a user specifies a plane through continuously pointing and sweeping the cursor through the flat regions of the plane. As shown in FIG. 5, the face of an object can be specified by selecting a "plane" option and sweeping the cursor (indicated by 502) over a particular flat surface. In some embodiments, the system inspects the surface points in a cone around the cursor and computes a dominant plane. The user can extend or reduce the selection with "plus" and "minus" options. The "plane" option may be helpful in instances with more complicated geometries. Furthermore, a user may be able to connect uneven planes by sweeping over the plane. For example, a door may have engravings that may restrict the door from being recognized as a single structure. In such instances, the user may sweep over the uneven edges of the door to generate a single rectangle for the door.

In some instances, the result may not be a face in this case, but an infinite plane. Planes may be intended to support the specification of faces. If a face is defined as a sequence of edge, the system may compare the face to all planes. If the face is sufficiently close to a plane, the plane constraints may be added to the specification of the face. In other words, the user can help the system to determine faces with better precision by also specifying planes, but this may not be necessary.

In some implementations, embodiments of the invention may allow for specifying extruded volumes. For example, if the user presses an "extrude" option after a face (the "bottom" face) has been specified, the user may specify a "top" point in space. A prism may be constructed by extruding the face in the direction of its normal so that the "top" face of the prism lies in the plane of the "top" point.

Alternative to the manual user interface, in some embodiments, a semi-automatic user interface may be employed for speedier operation. With this interface, the user may be given more options, and more parameters of the user input may be inferred dynamically. The user may be allowed to define some structures in arbitrary order, and the system may figure out more information on its own. For example, in a room, the user may be able to point to the ceiling corner that is intersected by three planes. The mobile device may infer the three planes and automatically generate the structural model.

Figure 6A:
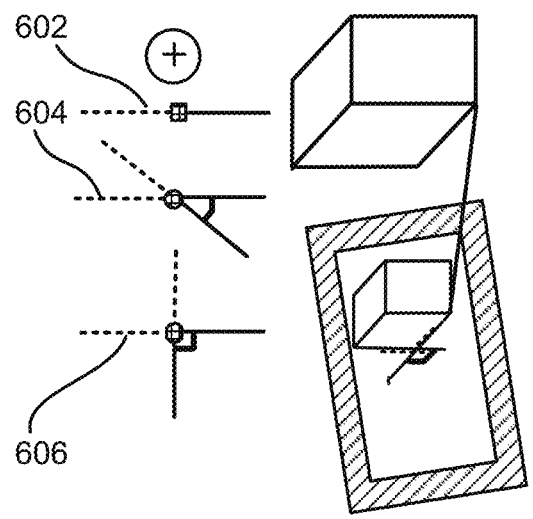
FIGS. 6A, 6B and 6C illustrate different example cursor types for selecting faces and planes.

FIG. 6A illustrates an on-plane cursor for specifying a face. It displays the estimated edge, normal corner, or orthogonal corner on the face. For example, as shown at 602, based on the geometry, components of the mobile device may interpret that the curser is pointed to an edge since the angle is approximately zero between the two edges. Similarly, as shown at 604 and 606, components of the mobile device may interpret that the curser is pointed towards a normal corner or an orthogonal corner, respectively, based on the angle between the edges.

Figure 6B:
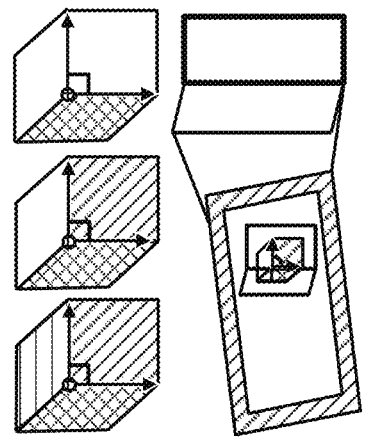
Figure 6C:
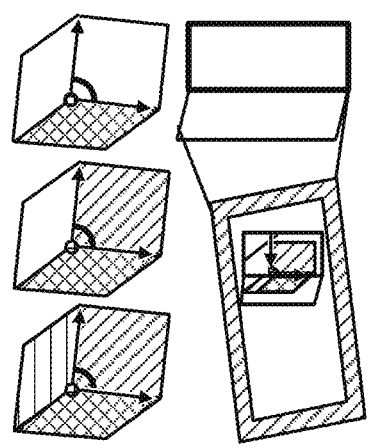

FIG. 6B illustrates an ortho-space cursor displaying one plane, two orthogonal planes, or a corner of three orthogonal planes when user moves the cursor freely in space and over an interesting local structure. FIG. 6C illustrates how a normal-space cursor may be similar to Ortho-space except for its orthogonality property.

In some implementations, the user may be provided with the option to select more than one cursor that allows the user to specify additional constraints. In some cases, the on-plane cursor may assume that the user has specified a plane, and lets the user input edges, arbitrary corners or right-angle corners. An ortho-space cursor may allow a user to input one, two or three adjacent polygons by pointing to a face, edge or corner. Furthermore, a normal-space cursor may be similar to the ortho-space cursor, but may not assume right-angles.

The current cursor type can be set by the user (manual mode) or automatically determined (automatic mode). In automatic mode, the system may determine cursor type depending on current estimated local structure (e.g., a reconstructed scene surrounding the cursor position). The visualized cursor image may be adapted to estimate the current local structure. For instance, FIG. 6A illustrates a current on-plane normal corner cursor while the cursor image is adapted to the estimated corner.

Figure 7A:
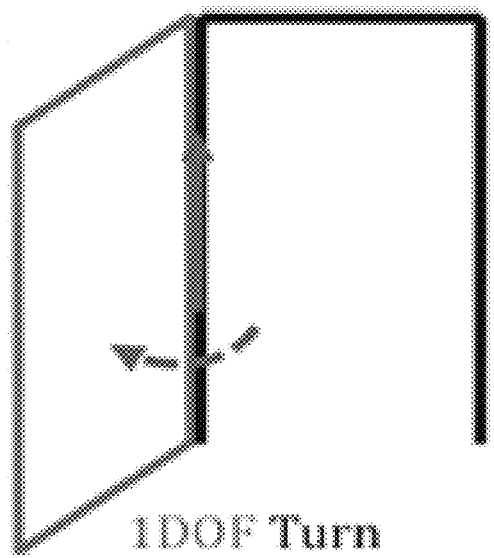
FIGS. 7A and 7B illustrate associating degrees of freedom (DOF) with objects in a structural model.
Figure 7B:
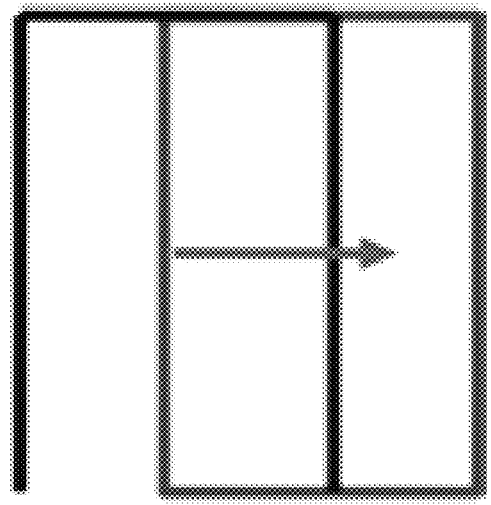

Any two objects may be defined as rigidly adjunct, as discussed in examples above or non-rigidly adjunct, according to certain embodiments of the invention. The non-rigidly adjunct objects can model moving parts such as doors or windows. Embodiments of the invention may describe multiple non-rigid types, for example, Turn and Slide, as illustrated in FIGS. 7A and 7B, respectively. For Turn, two parameters may be specified, rotation vector and range of turn. Slide may receive only one parameter, the sliding direction vector. Generally, to properly show the DOF (degree of freedom) associated with the device, the initial state and the end state of the object may be shown for components of the mobile device to infer the DOF associated with the object.

FIG. 7A illustrates an adjunct structural model that models an object being able to turn around another fixed object. For example, FIG. 7A may illustrate a door that pivots around the hinges on the wall. FIG. 7B illustrates an adjunct structural model that illustrates an object that can slide along another fixed object. For example, FIG. 7B may illustrate a sliding door, where one of the doors is fixed.

As shown in FIGS. 7A and 7B, providing non-rigid adjunct modeling may enable the user to model moving parts such as doors or windows. In FIG. 7A, for Turn adjunct, the user may first define the adjunct edge (this is also the rotation axis of this adjunct) between turn-able objects and fixed objects. Then, the user may define the range of rotation by rotating the mobile device 100 in an approximately similar rotation axis. The system may automatically map the device rotation to 1DOF (degree of freedom) Turn rotation accordingly.

In FIG. 7B, for Slide adjunct, the user first needs to select the sliding plane (contact between sliding object and fixed object). Then the user translates the mobile device 100 relative to a major orientation of the fixed objects in order to define sliding direction. The mobile device may allow users to adjust the orientation or position of a currently estimated local structure. This may be done through rotating or translating the mobile device 100 accordingly to adjust the estimated structure to a desirable orientation or position.

Figure 8:
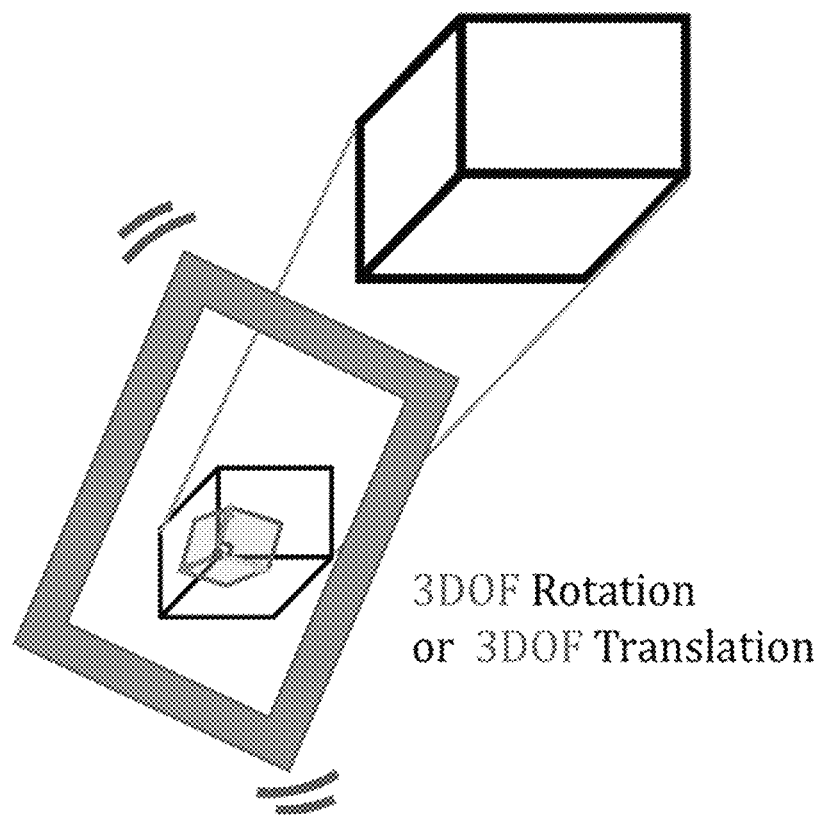
FIG. 8 illustrates an example for associating three DOF with an object.

FIG. 8 illustrates how a user can manipulate objects' orientation or position through rotating or translating the handle device respectively, consistent with the example embodiments discussed previously. For example, by providing the initial state and the intended end state to the mobile device, components of the mobile device may be able to infer the three DOF, as shown in FIG. 8.

Figure 9A:
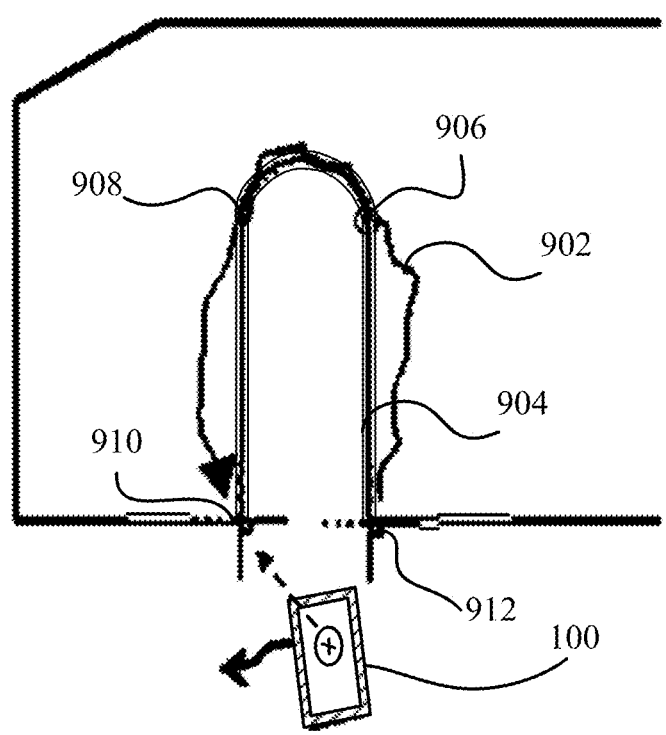
FIGS. 9A and 9B illustrate an example process of specifying a geometric face.

FIG. 9A illustrates the beginning of an example path of gestures used to specify a complex face in an example advanced mode of operation. As shown in FIG. 9A, the user may aim the cursor at the border of the face. As indicated by the squiggly line 902, while the user moves the cursor approximately around corners (both orthogonal or not) or edges (both straight or not), the system automatically snaps to points of interest indicating edges (906, 908, 910 and 912) estimating the local structure of the region surrounding the current cursor location. For example, the double lined edges, such as edge 904 in FIG. 9A, may indicate the edges identified by the device and displayed to the user. The system may provide feedback on the estimated structure to the user through visualizing appropriate cursor shapes (e.g., using the on-plane cursor from FIG. 6). The user may press a button to confirm the currently estimated structure. The user may also adjust orientation of the structure through Indirect Manipulation. Faintly, the user may also directly specify the local structure through clicking on a specific cursor type (if the system knows that it is in cursor manual mode) while performing the gesture.

Figure 9B:
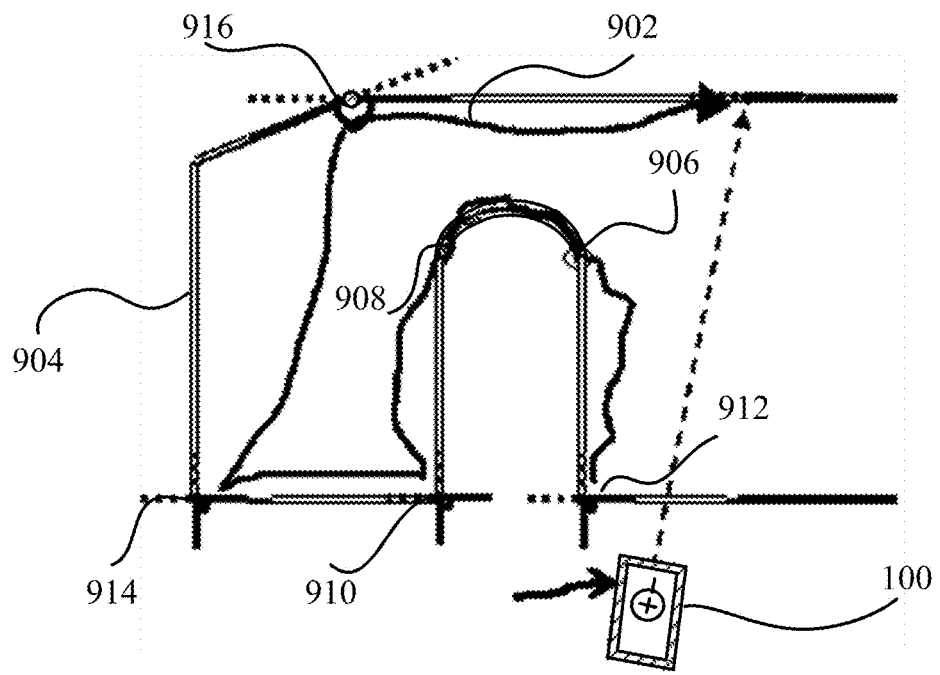

FIG. 9B illustrates the end of the mapping of the structural model, using the gesture from the user. The continuation of the squiggly line 902 in FIG. 9B, drawn by the user, creates a face by performing a continuous gesture that aims the cursor at regions of interest and additional points of interest indicating edges (914, 916 and 918) or the border of the face if necessary. During the gesture, the system automatically estimates local structures surrounding the cursor location, and instantly provides feedback to the user with a corresponding cursor image, according to some embodiments.

Figure 10A:
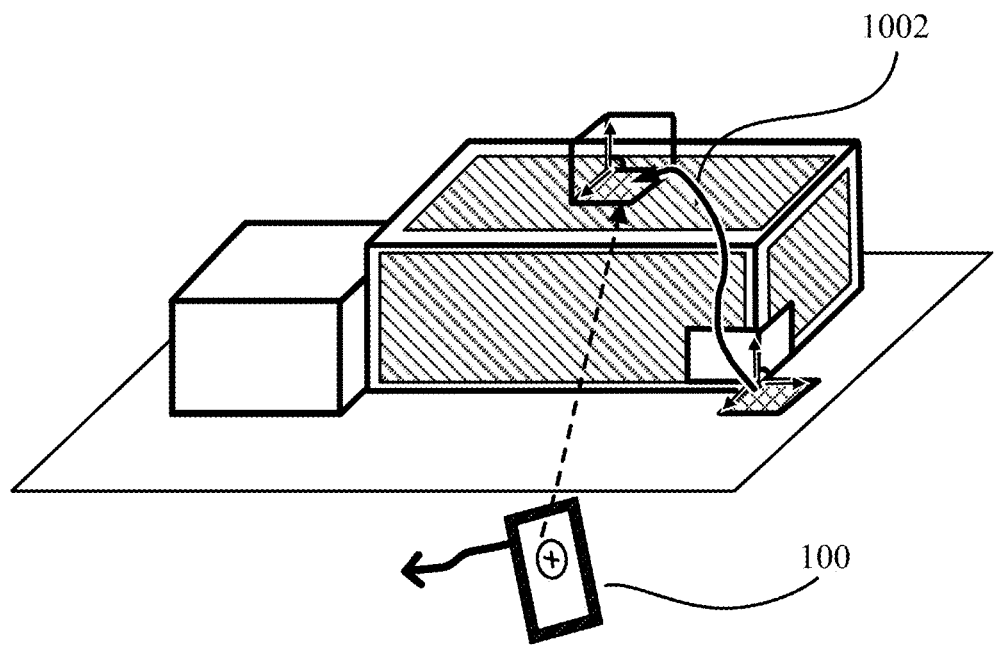
FIGS. 10A and 10B illustrate an example for specifying planes by approximately pointing the cursor to regions of interest.

As shown in FIG. 10A, the user targets the cursor to local structures of interest in order to define several planes and constraints (e.g., orthogonality) between planes. Similar to specifying edges on a 3D plane, when the user moves the cursor along the path 1002, the system automatically estimates underlying corresponding local 3D structures and figures out plane border. The system provides feedback to the user through visualizing the appropriate cursor image (illustrated as Ortho-Space or Normal-Space cursors in FIG. 6) and corresponding planes. The user can press a button to accept a currently estimated structure. Furthermore, the user can adjust the orientation of currently highlighted structures using Indirect Manipulation techniques. Of course, the user may also directly specify local structures through clicking on a specific cursor type.

Figure 10B:
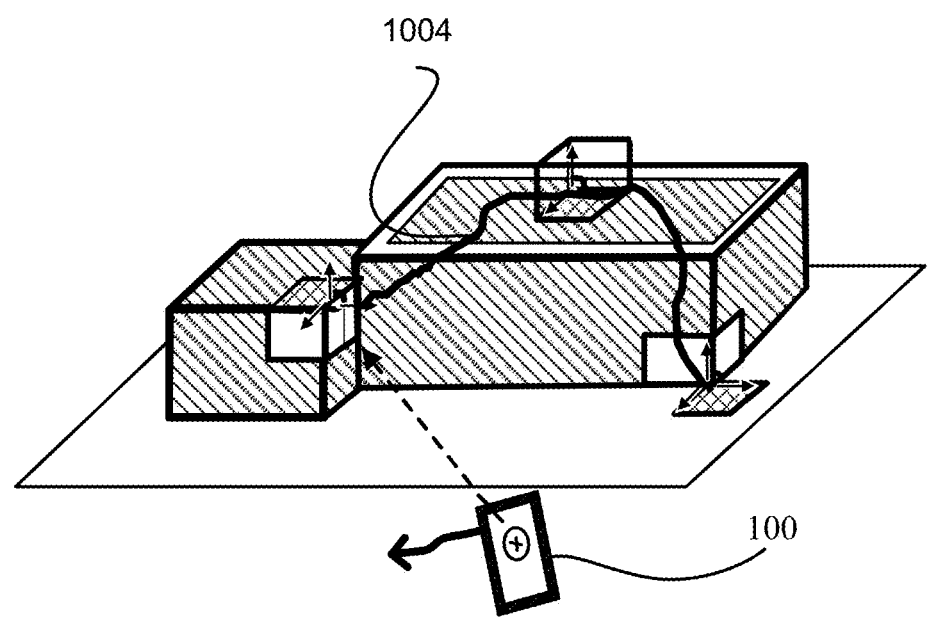

Referring to FIG. 10A and FIG. 10B, a user specifies planes (one, two, or three planes at a time) by approximately pointing the cursor to regions of interest (FIG. 10A shows the path 1002 during an earlier stage, whereas FIG. 10B shows a path 1004 during a later stage). The system instantly provides feedback for the estimated local structure through visualizing the appropriate adapted cursor image and corresponding planes. For example, the feedback system may visually highlight (not shown) structures that are being modeled.

There are a number of advantages of the present disclosures over existing methods meant to achieve similar purposes. For example, meaningful models become increasingly demanding in recent applications for mobile devices, such as AR applications. However, recent attempts from research and industrial communities failed to achieve such models in an intuitive way. In contrast, embodiments of the present disclosures take advantage of the combination of user input and automatic estimation in order to achieve quantitative and qualitative structural models. By combining control and easy input of hard-to-compute parameters within the user interface, with precision and automatic determination of easy-to-compute (but otherwise tedious-to-manually input) parameters/measurements from the depth sensing unit, embodiments of the invention allow for efficient structural modeling. Consequently, the embodiments of the present disclosure enable a user to generate structural models with semantic meaning faster and more efficiently than the current state-of-the-art while offering comparative accuracy.

Figure 11:
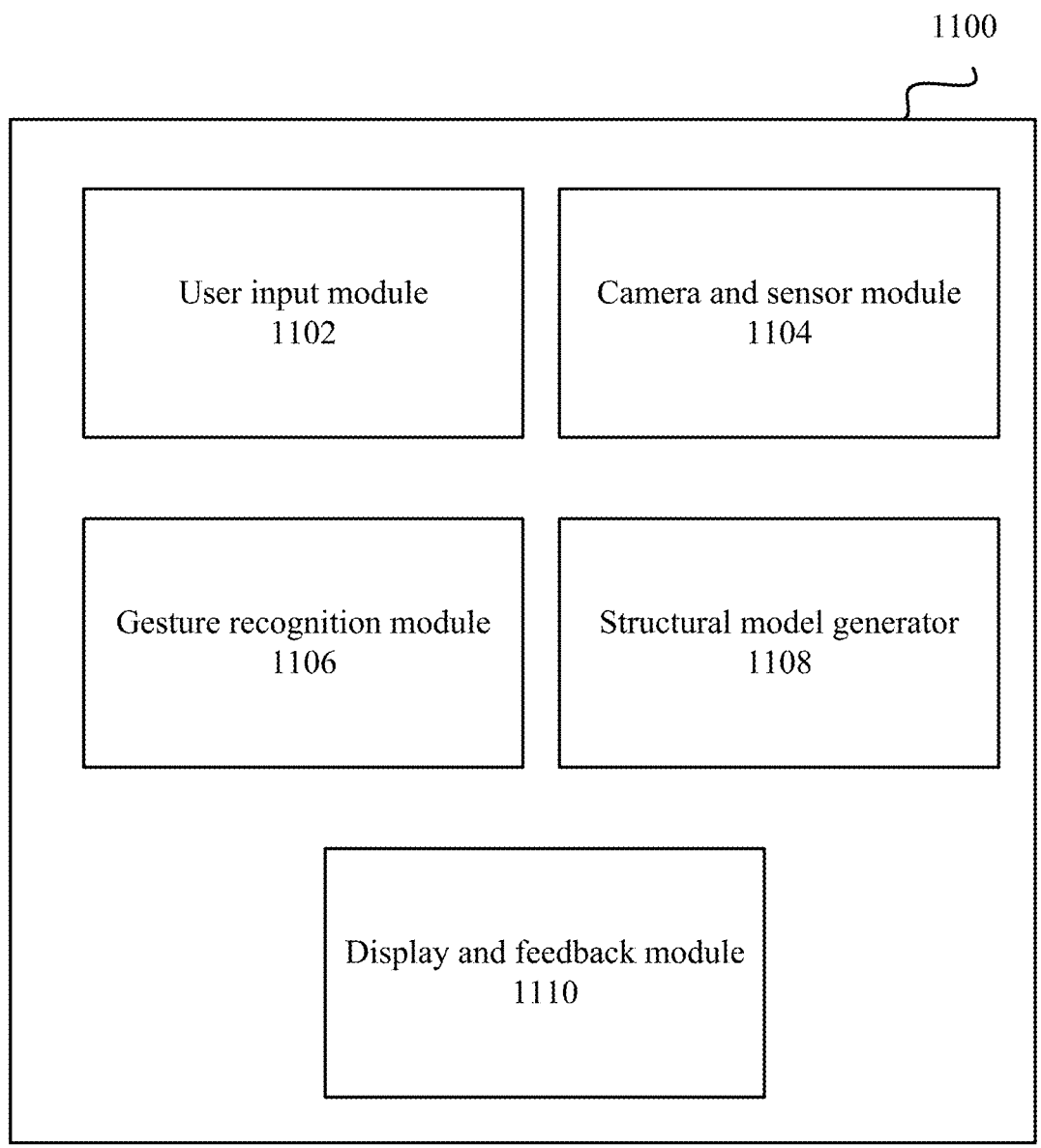
FIG. 11 illustrates a block diagram for example modules implemented in a mobile device according to one embodiment of the invention.

FIG. 11 illustrates a block diagram for example modules implemented in a mobile device 100 according to one embodiment of the invention. The mobile device may be a computer device implemented using one or more components described in FIG. 13. Modules described in FIG. 11 may be implemented using software, firmware, hardware or any other combination thereof. In one embodiment, the modules described in FIG. 11 may be stored as software modules on a computer-readable medium 1100 that may be any magnetic, electronic, optical, or other computer-readable storage medium. In one implementation, the computer-readable storage medium 1100 may include a user input module 1102, a camera and sensor module 1104, a gesture recognition module 1106, structural model generator 1108, and a display and feedback module 1110.

The user input module 1102 may be configured to receive user input through the user interface. For example, in one implementation, the user may provide input at the touchscreen of the mobile device 100 for selecting the appropriate mode, and the appropriate cursor type, and manipulating the cursor as described in figures above.

The camera and sensor module 1104 may be configured to receive the camera information from the camera components of the mobile device 100 and the depth information from the depth sensor on the mobile device 100.

The gesture recognition module 1106 may be configured to receive the camera and depth information from the camera and sensor module 1104. The gesture recognition module 1106 may determine the gesture, using the information from the camera and associate a command with the gesture. For example, the user may make a gesture to select the appropriate mode, select the appropriate cursor type and manipulate the cursor as described in the above figures.

The structural model generator 1108 may be configured to receive information for the user input module 1102, the camera and sensor module 1104 and the gesture recognition module. The structural model generator 1108 may be configured to combine the user input (via touchscreen and/or gesture) and the camera and depth sensor information to generate a structural model. In addition, the structural model generator 1108 may also annotate the structures from the structural model with semantics by requesting the user for annotating information.

The display and feedback module 1110 may be configured to display the augmented reality on the screen of the mobile device 100. The display and feedback module 1110 may receive the camera input from the camera and sensor module 1104 and overlay the structural model from the structural model generator 1108 on the display. The display and feedback module 1110 may also overlay the cursor and the path of the cursor over the display of the reality. Furthermore, the display and feedback module 1110 may highlight geometrical structures in the augmented reality view on the device to provide feedback to the user regarding the structures that have been modeled from the view of the device.

Figure 12:
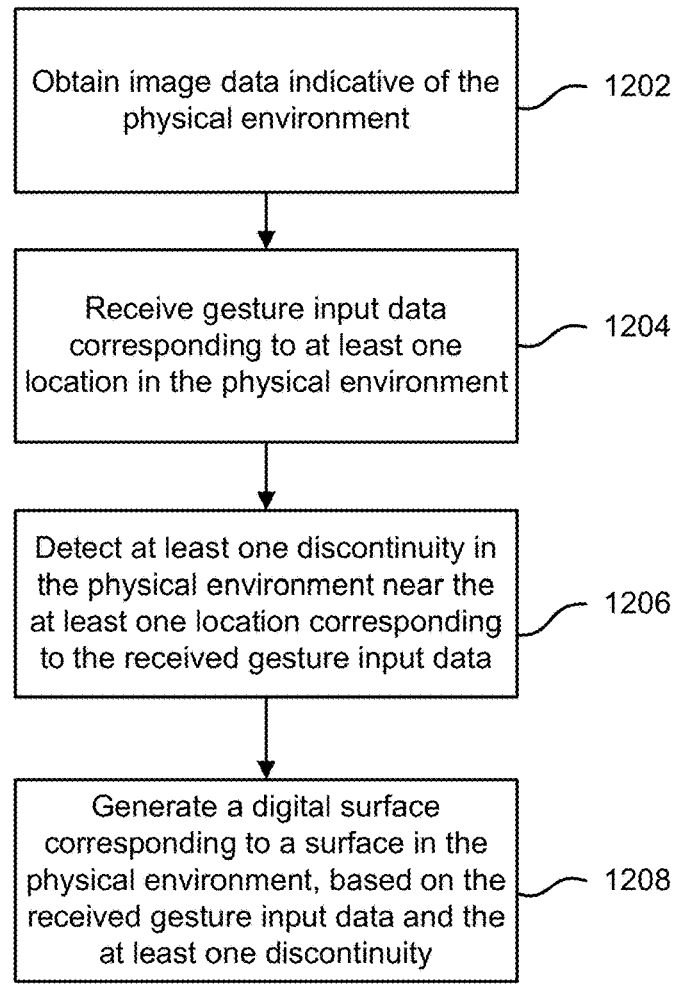
FIG. 12 is an example flowchart illustrating methods according to some embodiments.

FIG. 12 is a flow diagram illustrating a method for performing embodiments of the invention according to one or more illustrative aspects of the disclosure. According to one or more aspects, any and/or all of the methods and/or method steps described herein may be implemented by and/or in a mobile device 100, such as the mobile device 100 and/or the device described in greater detail in FIG. 13, for instance. In one embodiment, one or more of the method steps described below with respect to FIG. 12 are implemented by a processor of the mobile device 1300, such as the processor 1310 or another processor. Additionally or alternatively, any and/or all of the methods and/or method steps described herein may be implemented in computer-readable instructions, such as computer-readable instructions stored on a computer-readable medium such as the memory 1335, storage 1325 or another computer-readable medium.

The flowchart 1200 illustrates an example method flow for constructing a digital representation of a physical environment, according to some embodiments. At block 1202, image data indicative of the physical environment may be obtained. At block 1204, user input data may be received from a user, the gesture input data corresponding to at least one location in the physical environment, based on the obtained image data. Example user input data may include any of the types of example gestures and inputs described herein. Other types of user input or functions based on said user input may be apparent to persons having ordinary skill in the art, and embodiments are not so limited. At block 1206, at least one discontinuity may be detected in the physical environment near the at least one location corresponding to the received user input data. At block 1208, a digital surface corresponding to a surface in the physical environment may be generated, based on the received user input data and the at least one discontinuity. The example method described herein may be consistent with any of the disclosures described in any of the previous figures and descriptions. Example devices for implementing the example method herein may be any of the example devices previously mentioned in any of the previous figures and descriptions.

It should be appreciated that the specific steps illustrated in FIG. 12 provide a particular method of switching between modes of operation, according to an embodiment of the present invention. Other sequences of steps may also be performed accordingly in alternative embodiments. For example, alternative embodiments of the present invention may perform the steps outlined above in a different order. Furthermore, additional steps or variations to the steps may be added or removed depending on the particular applications. One of ordinary skill in the art would recognize and appreciate many variations, modifications, and alternatives of the process.

Many embodiments may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 13:
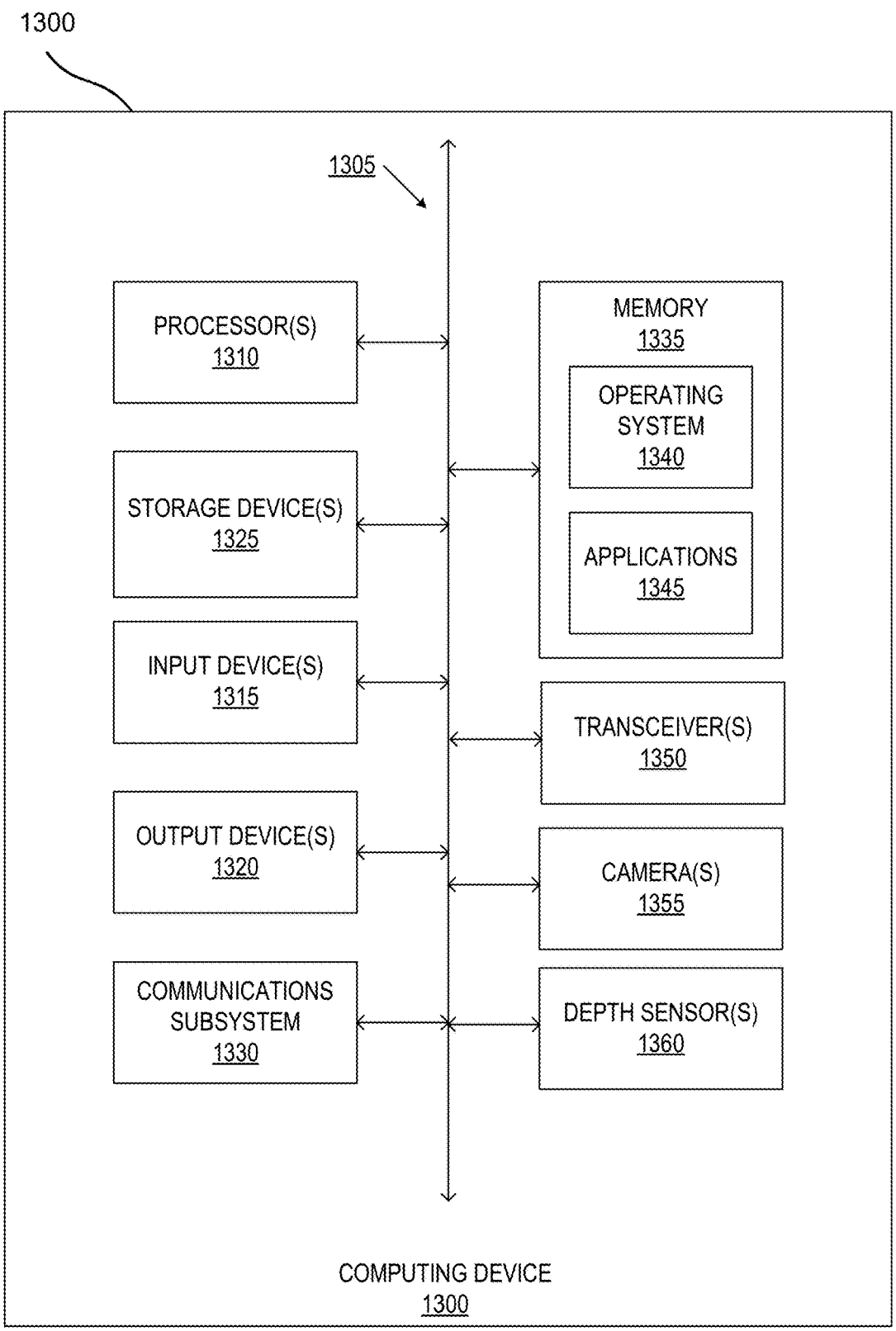
FIG. 13 is a block diagram of a computing device according to some embodiments.

Having described multiple aspects of defining a dense representation of a planar surface in AR environments, an example of a computing system in which various aspects of the disclosure may be implemented will now be described with respect to FIG. 13. According to one or more aspects, a computer system as illustrated in FIG. 13 may be incorporated as part of the mobile device 100, which may implement, perform, and/or execute any and/or all of the features, methods, and/or method steps described herein. For example, computer system 1300 may represent some of the components of a mobile device 100. A mobile device may be any computing device with an input sensory unit, such as a wireless receiver or modem. Examples of a mobile device include but are not limited to video game consoles, tablets, smart phones, televisions, AR goggles, head mounted devices, and mobile stations. In some embodiments, the system 1300 is configured to implement any of the methods described above. FIG. 13 provides a schematic illustration of one embodiment of a computer system 1300 that can perform the methods provided by various other embodiments, as described herein, and/or can function as the host computer system, a remote kiosk/terminal, a point-of-sale device, a mobile device, a set-top box, and/or a computer system. FIG. 13 is meant only to provide a generalized illustration of various components, any and/or all of which may be utilized as appropriate. FIG. 13, therefore, broadly illustrates how individual system elements may be implemented in a relatively separated or relatively more integrated manner.

The computer system 1300 is shown comprising hardware elements that can be electrically coupled via a bus 1305 (or may otherwise be in communication, as appropriate). The hardware elements may include one or more processors 1310, including without limitation one or more general-purpose processors and/or one or more special-purpose processors (such as digital signal processing chips, graphics acceleration processors, and/or the like); one or more input devices 1315, which can include without limitation a wireless receivers, wireless sensors, a mouse, a keyboard and/or the like; and one or more output devices 1320, which can include without limitation a display unit, a printer and/or the like. Furthermore, the hardware elements may also include one or more cameras 1355 for obtaining image data and one or more depth sensors 1360 for receiving depth information of the field of view of the camera.

In some embodiments, the one or more processor 1310 may be configured to perform a subset or all of the functions described above with respect to FIG. 13. The processor 1310 may comprise a general processor and/or and application processor, for example. In some embodiments, the processor is integrated into an element that processes visual tracking device inputs and wireless sensor inputs.

The computer system 1300 may further include (and/or be in communication with) one or more non-transitory storage devices 1325, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1300 might also include a communications subsystem 1330, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1330 may permit data to be exchanged with a network (such as the network described below, to name one example), other computer systems, and/or any other devices described herein. In many embodiments, the computer system 1300 will further comprise a non-transitory working memory 1335, which can include a RAM or ROM device, as described above. In some embodiments communications subsystem 1330 may interface with transceiver(s) 1350 configured to transmit and receive signals from access points or mobile devices. Some embodiments may include a separate receiver or receivers, and a separate transmitter or transmitters.

The computer system 1300 also can comprise software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 13, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1325 described above. In some cases, the storage medium might be incorporated within a computer system, such as computer system 1300. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1300) to perform methods in accordance with the disclosure. For example, some or all of the procedures of the described methods may be performed by the computer system 1300 in response to processor 1310 executing one or more sequences of one or more instructions (which might be incorporated into the operating system 1340 and/or other code, such as an application program 1345) contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein, for example methods described with respect to FIG. 13.

The terms "machine-readable medium" and "computer-readable medium," as used herein, refer to any medium that participates in providing data that causes a machine to operate in a specific fashion. In an embodiment implemented using the computer system 1300, various computer-readable media might be involved in providing instructions/code to processor(s) 1310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1325. Volatile media include, without limitation, dynamic memory, such as the working memory 1335. Transmission media include, without limitation, coaxial cables, copper wire and fiber optics, including the wires that comprise the bus 1305, as well as the various components of the communications subsystem 1330 (and/or the media by which the communications subsystem 1330 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1300. These signals, which might be in the form of electromagnetic signals, acoustic signals, optical signals and/or the like, are all examples of carrier waves on which instructions can be encoded, in accordance with various embodiments of the invention.

The communications subsystem 1330 (and/or components thereof) generally will receive the signals, and the bus 1305 then might carry the signals (and/or the data, instructions, etc. carried by the signals) to the working memory 1335, from which the processor(s) 1310 retrieves and executes the instructions. The instructions received by the working memory 1335 may optionally be stored on a non-transitory storage device 1325 either before or after execution by the processor(s) 1310. Memory 1335 may contain at least one database according to any of the databases and methods described herein. Memory 1335 may thus store any of the values discussed in any of the present disclosures, including FIGS. 1, 2, 3, 4, 5, 6, 7, 8, 9, 10, 11, 12 and related descriptions.

The methods described in FIG. 12 may be implemented by various blocks in FIG. 13. For example, processor 1310 may be configured to perform any of the functions of blocks in flowchart 1200. Storage device 1325 may be configured to store an intermediate result, such as a globally unique attribute or locally unique attribute discussed within any of blocks mentioned herein. Storage device 1325 may also contain a database consistent with any of the present disclosures. The memory 1335 may similarly be configured to record signals, representation of signals, or database values necessary to perform any of the functions described in any of the blocks mentioned herein. Results that may need to be stored in a temporary or volatile memory, such as RAM, may also be included in memory 1335, and may include any intermediate result similar to what may be stored in storage device 1325. Input device 1315 may be configured to receive wireless signals from satellites and/or base stations according to the present disclosures described herein. Output device 1320 may be configured to display images, print text, transmit signals and/or output other data according to any of the present disclosures.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. A number of steps may be undertaken before, during, or after the above elements are considered. Accordingly, the above description does not limit the scope of the disclosure.

Various examples have been described. These and other examples are within the scope of the following claims.

What is claimed is:
1. A method for generating one or more structural models of one or more physical objects in a physical environment, the method comprising:
   obtaining image data defining an image depicting the physical environment;
   obtaining user input data defining an outline of an area in the image associated with a physical object in the physical environment;
   generating, using the obtained image data and the user input data, a structural model of the physical object in the physical environment;

receiving, after generating the structural model of the physical object, user input defining semantic information for the structural model of the physical object, the semantic information defining at least one functionality of the structural model, wherein additional semantic information for the structural model defines one or more functional constraints constraining the at least one functionality of the structural model, the at least one functionality including at least a type of movement of the structural model and the one or more functional constraints constraining at least the type of movement; and applying the semantic information and the additional semantic information to the generated structural model of the physical object, wherein applying the semantic information and the additional semantic information to the generated structural model of the physical object enables the generated structural model to be manipulated according to the at least one functionality and the one or more functional constraints.

2. The method of claim 1, further comprising:
manipulating the structural model of the physical object based on the semantic information defined for the physical object.

3. The method of claim 2, wherein the structural model of the physical object is manipulated based on received user input causing manipulation of the structural model.

4. The method of claim 2, wherein manipulating the structural model of the physical object includes changing a position of at least a portion of the structural model.

5. The method of claim 4, wherein the position of at least the portion of the structural model is constrained by the one or more functional constraints defined by the additional semantic information.

6. The method of claim 2, wherein manipulating the structural model of the physical object includes changing a size of at least a portion of the structural model.

7. The method of claim 1, wherein the semantic information or the additional semantic information further defines one or more characteristics of the physical object, and wherein applying the semantic information or the additional semantic information to the structural model of the physical object includes displaying at least a portion of the structural model with the one or more characteristics.

8. The method of claim 1, further comprising:
generating a plurality of structural models of a plurality of physical objects in the physical environment; and
generating a digital representation of the physical environment, the digital representation including the plurality of structural models of the plurality of physical objects in the physical environment.

9. The method of claim 1, wherein the image data includes depth information of the physical environment, and further comprising:
detecting, based on the user input data defining the outline of the area in the image, at least one depth discontinuity in the physical environment using the depth information of the obtained image data; and
identifying an edge of a surface of the physical object in the physical environment, wherein the edge is identified based on the detected at least one depth discontinuity in the physical environment; and
wherein generating the structural model includes generating a digital surface corresponding to the surface of the physical object in the physical environment, and wherein an edge of the digital surface is generated based on the identified edge.

10. The method of claim 1, further comprising:
identifying, based on the user input data defining the outline of the area in the image, an edge of a surface of the physical object in the physical environment.

11. An apparatus for generating one or more structural models of one or more physical objects in a physical environment, comprising:
a memory configured to store image data defining one or more images; and
a processor coupled to the memory and configured to:
obtain image data defining an image depicting the physical environment;
obtain user input data defining an outline of an area in the image associated with a physical object in the physical environment;
generate, using the obtained image data and the user input data, a structural model of the physical object in the physical environment;
receive, after generating the structural model of the physical object, user input defining semantic information for the structural model of the physical object, the semantic information defining at least one functionality of the structural physical model, wherein additional semantic information for the structural model defines one or more functional constraints constraining the at least one functionality of the structural model, the at least one functionality including at least a type of movement of the structural model and the one or more functional constraints constraining at least the type of movement; and
apply the semantic information and the additional semantic information to the generated structural model of the physical object, wherein applying the semantic information and the additional semantic information to the generated structural model of the physical object enables the generated structural model to be manipulated according to the at least one functionality and the one or more functional constraints.

12. The apparatus of claim 11, wherein the processor is configured to:
manipulate the structural model of the physical object based on the semantic information defined for the physical object.

13. The apparatus of claim 12, wherein the structural model of the physical object is manipulated based on received user input causing manipulation of the structural model.

14. The apparatus of claim 12, wherein manipulating the structural model of the physical object includes changing a position of at least a portion of the structural model.

15. The apparatus of claim 14, wherein the position of at least the portion of the structural model is constrained by the one or more functional constraints defined by the additional semantic information.

16. The apparatus of claim 12, wherein manipulating the structural model of the physical object includes changing a size of at least a portion of the structural model.

17. The apparatus of claim 11, wherein the semantic information or the additional semantic information further defines one or more characteristics of the physical object, and wherein applying the semantic information or the additional semantic information to the structural model of the physical object includes displaying at least a portion of the structural model with the one or more characteristics.

18. The apparatus of claim 11, wherein the processor is configured to:
  generate a plurality of structural models of a plurality of physical objects in the physical environment; and
  generate a digital representation of the physical environment, the digital representation including the plurality of structural models of the plurality of physical objects in the physical environment.

19. The apparatus of claim 11, wherein the obtained image data includes depth information of the physical environment, and wherein the processor is configured to:
  detect, based on the user input data defining the outline of the area in the image, at least one depth discontinuity in the physical environment using the depth information of the obtained image data; and
  identify an edge of a surface of the physical object in the physical environment, wherein the edge is identified based on the detected at least one depth discontinuity in the physical environment; and
  wherein generating the structural model includes generating a digital surface corresponding to the surface of the physical object in the physical environment, and wherein an edge of the digital surface is generated based on the identified edge.

20. The apparatus of claim 11, wherein the processor is configured to:
  identify, based on the user input data defining the outline of the area in the image, an edge of a surface of the physical object in the physical environment.

21. The apparatus of claim 11, further comprising:
  a camera configured to capture the image data defining the image depicting the physical environment.

22. The apparatus of claim 11, further comprising:
  a display configured to display a digital representation of the physical environment.

23. The apparatus of claim 11, wherein the apparatus comprises a mobile device including:
  a camera for capturing the image data defining the image depicting the physical environment; and
  a display configured to display a digital representation of the physical environment.

24. A non-transitory computer-readable medium having stored thereon instructions that, when executed by one or more processors, cause the one or more processors to:
  obtain image data defining an image depicting a physical environment;
  obtain user input data defining an outline of an area in the image associated with a physical object in the physical environment;
  generate, using the obtained image data and the user input data, a structural model of the physical object in the physical environment;
  receive, after generating the structural model of the physical object, user input defining semantic information for the structural model of the physical object, the semantic information defining at least one functionality of the structural model, wherein additional semantic information for the structural model defines one or more functional constraints constraining the at least one functionality of the structural model, the at least one functionality including at least a type of movement of the structural model and the one or more functional constraints constraining at least the type of movement; and
  apply the semantic information and the additional semantic information to the generated structural model of the physical object, wherein applying the semantic information and the additional semantic information to the generated structural model of the physical object enables the generated structural model to be manipulated according to the at least one functionality and the one or more functional constraints.

25. The non-transitory computer-readable medium of claim 24, further comprising instructions that, when executed by one or more processors, cause the one or more processors to:
  manipulate the structural model of the physical object based on the semantic information defined for the physical object.

26. The non-transitory computer-readable medium of claim 25, wherein manipulating the structural model of the physical object includes changing at least one or more of a position or a size of at least a portion of the structural model.

27. The non-transitory computer-readable medium of claim 24, wherein the semantic information or the additional semantic information further defines one or more characteristics of the physical object, and wherein applying the semantic information or the additional semantic information to the structural model of the physical object includes displaying at least a portion of the structural model with the one or more characteristics.

* * * * *